United States Patent

[11] 3,612,079

[72] Inventors George R. Schillinger
St. Louis, Mo.;
Kenneth W. Axetell, Jr., St. Louis, Mo.; S.
James Ryckman, Dayton, Ohio
[21] Appl. No. 884,399
[22] Filed July 17, 1969
[45] Patented Oct. 12, 1971
[73] Assignee Environmental Triple S. Company
St. Louis, Mo.

[54] PROCESS AND APPARATUS FOR EQUALIZATION OF FLUID FLOW CONCENTRATION
15 Claims, 8 Drawing Figs.

[52] U.S. Cl. .................................................. 137/1,
137/590
[51] Int. Cl. .................................................. C02c 1/00
[50] Field of Search ........................................ 137/1, 604,
590, 268; 222/464; 4/1

[56] References Cited
UNITED STATES PATENTS

| | | | |
|---|---|---|---|
| 359,401 | 3/1887 | Pabst | 222/464 |
| 588,418 | 8/1897 | Gaynor | 137/599 X |
| 1,010,052 | 11/1911 | Hooper | 137/604 X |
| 1,743,966 | 1/1930 | Goudard | 137/590 X |
| 2,539,663 | 1/1951 | Hague | 137/266 X |
| 3,260,421 | 7/1966 | Rabussier | 222/464 X |
| 3,490,655 | 1/1970 | Ledgett | 222/464 X |

Primary Examiner—M. Cary Nelson
Assistant Examiner—Richard Rothman
Attorney—Kingsland, Rogers, Ezell, Eilers & Robbins ABSTRACT: A process and apparatus for equalization of concentrations of fluid materials. The process and apparatus are designed for effluent discharges in industrial plants or sewage systems and the like in which slugs of high concentration of material are charged to an effluent waste or sewer line at intermittent periods. The process and apparatus tend to equalize the slug of high concentration to a value approaching normal or average concentrations in the effluent. The process and apparatus comprise charging the waste material with a slug of high concentration in an equalization tank in which the charge is made at a multiplicity of spaced regions in the tank. The charge into the tank is effected at points generally perpendicularly to the flow of fluid to the tank and the influent conduits are disposed generally parallel to the flow of fluid through the tank to accomplish the spread of the high concentration slug through the tank in the form of a "front," which is gradually composited in the effluent conduits and mixed with fluid of average pollutant concentration. Discharge from the tank is effected by a plurality of effluent conduits parallel to each other and to flow having a sealed end in the tank with openings at intervals throughout the length of the conduits for receiving the waste fluid. Thus, a value approaching equalization of the concentration in the effluent of the conduit is effected in the effluent line leading from the tank to discharge.

PATENTED OCT 12 1971 3,612,079
SHEET 1 OF 2
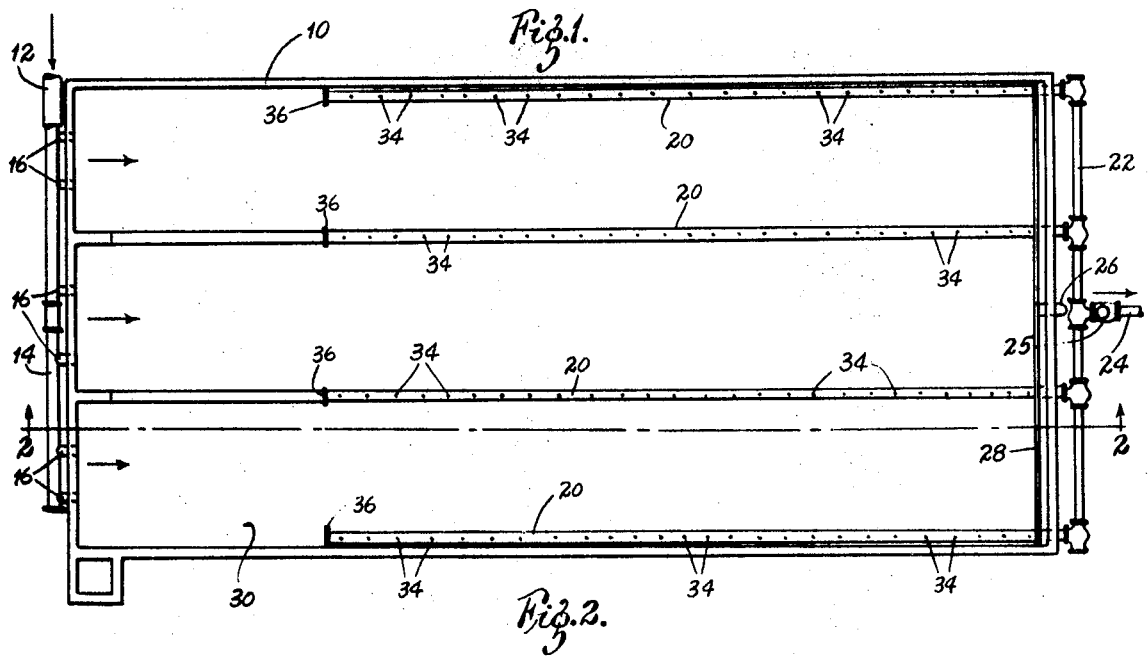
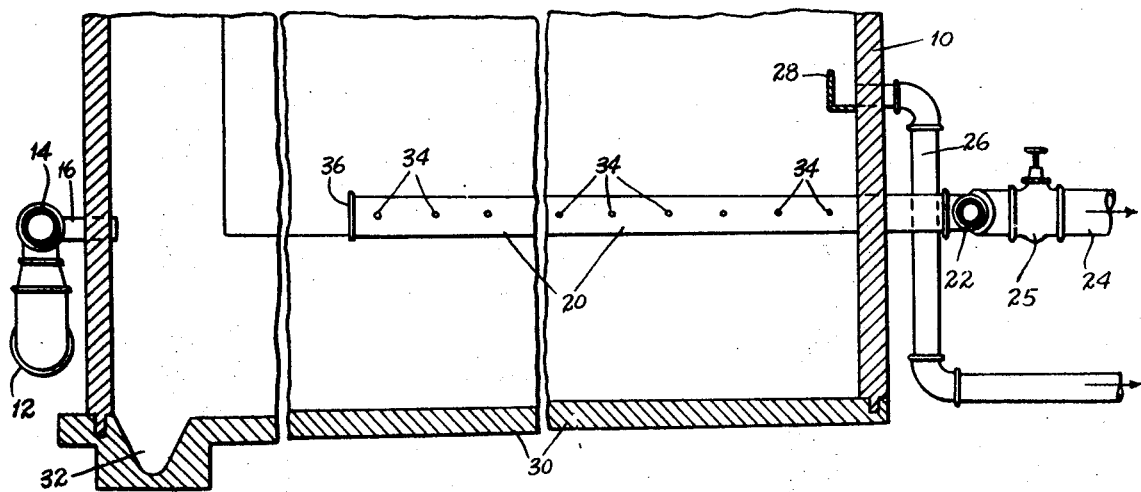
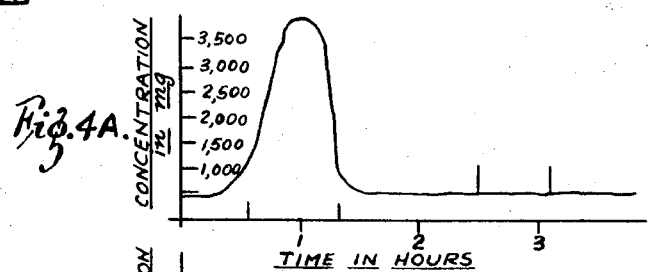
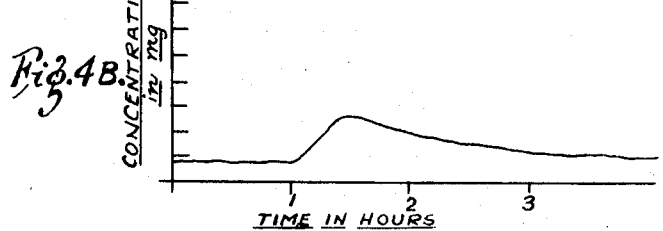

PROCESS AND APPARATUS FOR EQUALIZATION OF FLUID FLOW CONCENTRATION

BACKGROUND OF THE INVENTION

In the past, industrial plants and sewage systems and the like have been plagued with the problem of treating intermittent high concentrations of waste material. Such high concentrations may be for a short period of time, occasioned by the sudden dumping of a bad batch of chemicals or other high pollutant fluids, and may be beyond the level of subsequent treating equipment which poses a dangerous disposal problem. Efforts in the past have been made to provide for equalization through mixers and agitators where the waster material is charged into a tank. Such means in the past have required a large capital investment in the equipment to provide for the agitation or mixing, and have required moving parts necessitating maintenance and power consumption.

By means of the instant invention, there has been provided an equalization tank having no moving parts and requiring only a simple arrangement of the flow line of the waste material into the tank at a plurality of points from a manifold at the inlet end of the tank generally arranged across the front of the tank to establish a "front" or block of high pollutant material which progresses toward the outlet end of the tank. Equalization or dampening of the high concentration slug of waste material is effected through a plurality of parallel spaced effluent conduits arranged parallel to the flow of the material through the tank. These conduits are provided with a sealed end and openings positioned along the conduits. The openings admit gradually the high concentration waste material in the front along with normal waste material. By this means equalization or dampening of the high concentration slug of waste material is effected through mixing with the fluid waste material of normal concentration. The mixed waste material containing the slug in the equalized or dampened concentration is collected in the effluent conduits and manifolded therefrom to an effluent discharge line.

By means of the process and apparatus of this invention, a simply constructed treatment tank has been provided which is relatively simple to install and requires a minimum of maintenance and low cost in capital investment. The apparatus requires no moving parts and, through its simplicity, has a wide adaptability for employment wherever equalization or dampening of high concentrations of waste fluid is desired.

The above features are objects of this invention and further objects will appear in the detailed description which follows and will be otherwise apparent to those skilled in the art.

For the purpose of description of this invention, there will be shown in the accompanying schematic drawings a preferred embodiment thereof. It is to be understood that these drawings are for the purpose of example only and that the invention is not limited thereto.

In the drawings:

FIG. 1 is a top plan view of the flow concentration equalization apparatus;

FIG. 2 is a view in section taken on the line 2—2 of FIG. 1;

FIG. 4A is a graph showing the concentrations in a normal flow pattern in which a conventional conduit is subjected to a slug of high concentration material; and FIG. 4B is a graph showing the same discharge of material as in FIG. 4A but equalized or leveled in concentration after it has been passed through the apparatus of this invention and subjected to the process of this invention.

DESCRIPTION OF THE INVENTION

Figure 3A:
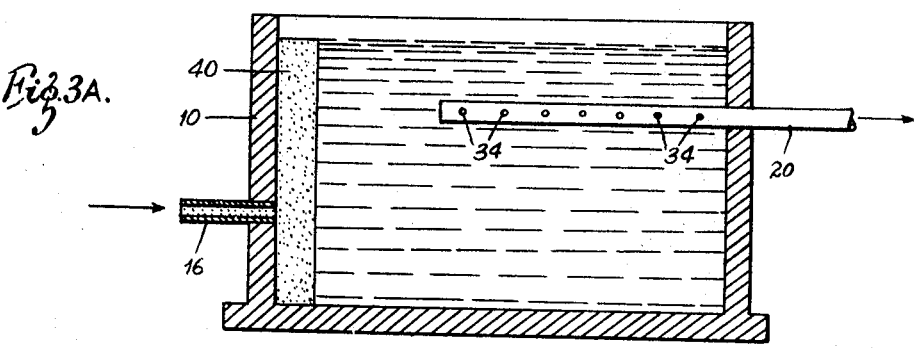
FIG. 3A through 3D are schematic drawings showing the slug of high concentration fluid as it moves through the apparatus and the level of concentration through the effluent.

Waste water entering an industrial waste water treatment plant is often characterized by wide variations in physical and chemical composition and by wide fluctuations in flow rate. It has long been recognized in waste treatment plant design that in order to maintain the maximum effectiveness of treatment operations, the pollutional characteristics and flow rate should be held as nearly uniform as possible. Equalization or dampening facilities provide such uniformity by averaging extremes in raw waste water quantity and quality.

Equalization or dampening of the waste water concentration of pollution is accomplished in this invention by hydraulic technique where no mechanical agitation is required. The effluent collection orifices in the equalization or dampening tank are designed to average waste water pollutant levels by integral dilution of waste characteristics. The equalization reduces the extremes or extremely high concentrations in the waste water for more uniform or equalized raw waste water discharge. The equalization is essentially effected by an averaging or compositing hydraulic technique in the process and apparatus of this invention.

In FIGS. 1 and 2 the equalization tank is generally indicated by the reference numeral 10. It is comprised of an influent pipe 12, connected to a header 14, provided with six pipes 16 opening at right angles into the front end of the tank. The tank is provided with four effluent conduits 20, which are connected into an effluent header 22 discharging to an effluent collector conduit 24. A valve 25 is provided to maintain a water level between the level of the centerline of the effluent conduits 20 and the overflow conduit 26.

An overflow conduit 26 is provided with a baffle or weir 28 to provide for overflow of material in extreme flow situations. The tank as drawn has a sloping bottom 30 and a sludge removal sump 32 for collection of solids, which is not essential to the equalization function of the invention.

The effluent conduits 20, as best shown in FIG. 2, are provided with a plurality of aligned openings 34. The perforations are designed to admit fluid to the interior of the effluent conduit 20 along the entire length of the conduits. A sealed cap 36 is provided at the end of the conduit to insure that admittance is effected only through openings 34.

OPERATION

The operation of the tank is effected very simply by discharging waste material through the conduit 12 and the header 14 and the pipes 16 into the tank 10. The drawing is not to scale and it will be understood that the length of the tank may be several times the depth. The tank is filled and by appropriate regulation of the valve 25, when the tank has been filled above the level of the openings 34 in the conduits 20, discharge is effected.

The equalization or dampening of a slug of highly concentrated waste fluid is best shown by referring to drawings 3A through 3D. In drawing 3A, a slug of highly concentrated waste water material, indicated by stippling and designated by the reference numeral 40, enters the influent end of the tank. It is to be understood that the depiction of the slug in the rectangular form is exaggerated for the purpose of simplicity in illustration. In operation it will form a front of varying concentration as diffusion occurs in the movement through the tank. Such a slug could result from a spill of raw materials or the sewering of a bad batch of chemicals. The inlets are so designed as to disperse the influent slug of material throughout the depth and width of the tank perpendicularly to the flow of material through the tank.

In drawing 3B, the slug 40 of waste water of high concentration has completely entered the basin and continued to move slowly toward the effluent end as a discrete block or "front." Once the slug clears the plant sewer system, the waster water concentration entering the equalization tank 10 returns to a normal concentration behind the slug of high concentration fluid. In this drawing the leading edge of the front of high concentration fluid is shown just encountering the effluent conduits 20.

In drawing 3C, the waste water block migrates or moves down the tank and a portion is withdrawn from the block or front as it passes over the orifices in the outlet or effluent conduits 20. This portion of high concentration waste water is mixed inside the pipes with additional portions of normal strength waste water. The result of this mixing of various concentrations of waste is a composite waste water which leaves the tank at a pollutant concentration more nearly representative of the average operating conditions.

In drawing 3D, the waste water block or front has continued to move toward the effluent end of the basin, and, as it moves, it decreases in size as more of the front is withdrawn into the orifices of the effluent conduits 20. When the front has reached the end of the basin, it has been wholly composited within the effluent conduits.

Figure 3B:
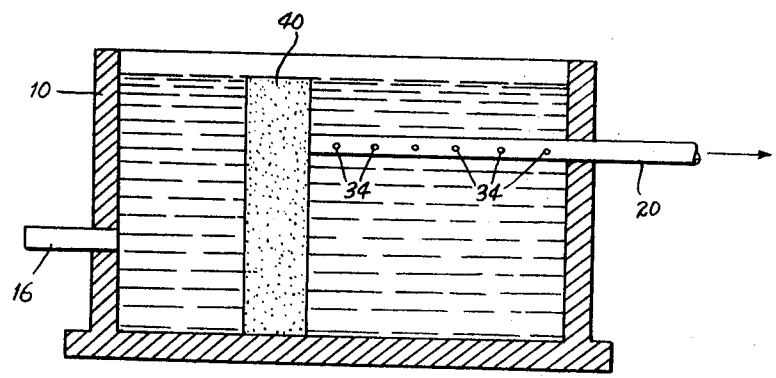
Figure 3C:
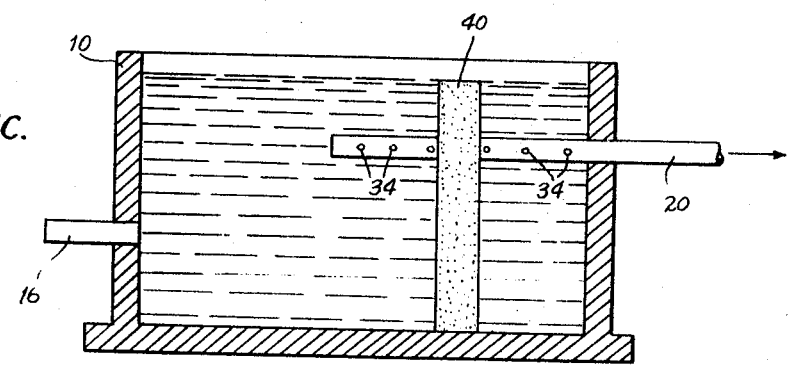
Figure 3D:
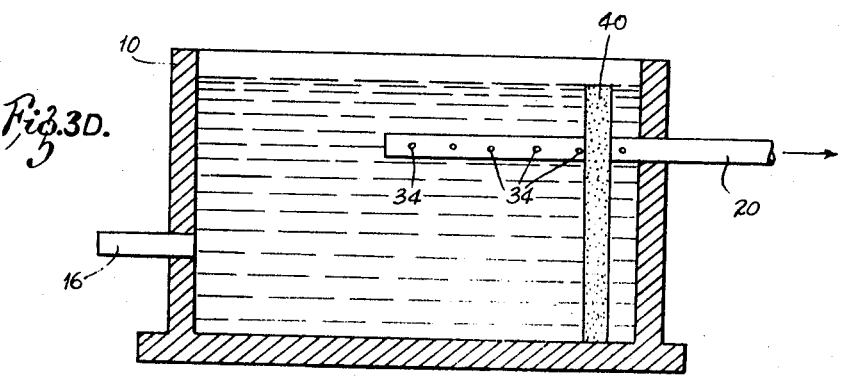

The graphs of FIGS. 4A and 4B illustrate the slug equalization or dampening described above for FIGS. 3A through 3D. In these graphs the normal waste water pollutant concentration is, for purpose of example, taken at about 500 milligrams per liter. A single ½-hour slug is charged with a pollutant strength of about 3,500 milligrams per liter and is desired to be equalized or dampened.

The desirable effects of slug equalization are shown in FIG. 4B. The equalization facility significantly controls the pollutional strength of waste waters to be handled by waste treatment units by dampening the high concentration slug effects over a broad time base to approach the normal concentration of the waste fluid. In this process, attendant equipment associated with subsequent treatment units, can be designed to operate with minimal fluctuation greatly simplifying their design and improving their operation.

Various changes and modifications may be made within this invention as will be readily apparent to those skilled in the art. Such changes and modifications are within the scope and teaching of this invention as defined by the claims appended hereto.

What is claimed is:

1. A process for equalization of concentrations of fluid materials in a flow line subject to concentration variations which comprises, establishing a fluid body within a (the) tank, discharging said flow line at varying concentrations in (a) the tank intermediately (in) the top and the bottom of the body of fluid and establishing an effluent discharge directly in an uninterrupted flow pattern from said flow line discharge generally parallel to and through a horizontal conduit means situated intermediately of the body of fluid in the tank, said conduit means having a sealed end and means in said conduit for receiving said fluid materials into said conduit along the length of said conduit.

2. The process of claim 1 in which the flow line is discharged in the tank at a plurality of spaced inlets and the effluent discharge is effected through a plurality of conduits.

3. The process of claim 2 in which the discharge of the flow line into the tank is disposed at a multiplicity of spaced regions in the tank disposed generally across the flow of fluid through the tank.

4. The process of claim 3 in which the conduit means comprises a plurality of conduits disposed generally parallel to the flow of fluid through the tank.

5. The process of claim 1 in which the discharge from the tank is controlled to about the same rate of influent flow into the tank.

6. The process of claim 1 in which the conduit means is disposed generally parallel to the flow of fluid through the tank.

7. The process of claim 1 in which the means for receiving said fluid materials comprises spaced openings along the length of said conduit means.

8. A tank for equalizing concentrations of waste material from a flow line subject to concentration variations, said tank comprising means for charging the contents of said flow line to the tank intermediately the bottom of the tank and the level of an overflow outlet and discharge means for establishing an effluent discharge through a horizontal conduit having a sealed end in said tank, said conduit being situated intermediately the bottom of the tank and the overflow outlet and means in said conduit for receiving said fluid materials into said conduit along the length of said conduit.

9. The tank of claim 8 in which the means for charging the contents of the flow line to the tank comprises a plurality of spaced inlets at an inlet end of the tank and said discharge means comprises a plurality of conduits.

10. The tank of claim 9 in which means are provided for regulating the surface level of the fluid in the tank above the effluent conduits.

11. The tank of claim 9 in which the charge of the flow line into the tank is disposed at a multiplicity of spaced regions in the tank disposed across the front of the tank.

12. The tank of claim 11 in which the conduits are disposed generally parallel to the flow of fluid through the tank.

13. The tank of claim 8 in which control means are provided to regulate the discharge from the tank to about the same amount as the influent discharge into the tank.

14. The tank of claim 8 in which the effluent conduit is disposed generally parallel to the flow of fluid through the tank.

15. The tank of claim 14 in which the axially spaced means for receiving said fluid materials comprises spaced openings along the length of said conduit.